United States Patent [19]

Herliczek

[11] 4,284,677
[45] Aug. 18, 1981

[54] GLAZING UNIT

[75] Inventor: Siegfried H. Herliczek, Petersburg, Mich.

[73] Assignee: Libbey-Owens-Ford Company, Toledo, Ohio

[21] Appl. No.: 32,810

[22] Filed: Apr. 24, 1979

[51] Int. Cl.³ .......................... B32B 1/04; E04C 1/00; B32B 17/10; B32B 15/02
[52] U.S. Cl. .................... 428/192; 219/203; 219/522; 244/121; 244/129.3; 428/200; 428/209; 428/210; 428/138; 428/437; 428/441; 428/433; 428/501; 428/521; 428/524
[58] Field of Search ............ 428/437, 441, 501, 524, 428/426, 192, 195, 210, 200, 209, 521, 138, 433; 219/522, 203; 244/121, 129.3

[56] References Cited

U.S. PATENT DOCUMENTS

| | | | |
|---|---|---|---|
| 2,697,675 | 12/1954 | Gaiser | 428/428 |
| 3,288,667 | 11/1966 | Martin | 428/441 |
| 3,356,833 | 12/1967 | Orcutt | 219/522 |
| 3,612,745 | 12/1971 | Warren | 219/522 |
| 3,740,281 | 6/1973 | Fujiwaka | 428/437 |
| 3,903,396 | 9/1975 | Boaz | 219/522 |
| 4,073,986 | 2/1978 | Keslar | 219/522 |

Primary Examiner—Ellis P. Robinson
Attorney, Agent, or Firm—Collins, Oberlin & Darr

[57] ABSTRACT

An electrically heated laminated aircraft glazing including at least two sheets of glass and an interposed nonbrittle thermoplastic interlayer. A bus bar and an electrically conducting film are located on the inwardly disposed surface of one of the sheets and the bus bar covered with a thin layer of polyisobutylene resin. Additional layers of polyisobutylene resin are provided between the interlayer material and selected glass areas to prevent delamination and cold chipping of the glazing with subsequent moisture ingress and bus bar failure.

3 Claims, 3 Drawing Figures

GLAZING UNIT

BACKGROUND OF THE INVENTION

This invention relates generally to laminated window panels and more particularly is concerned with an improved electrically conducting laminated aircraft glazing.

The construction and use of electrically heated laminated panels for aircraft windows or windshields is well known. Generally, the panel consists of an electrical heating circuit located between two or more sheets of glass or other rigid transparent plies which are bonded together by a thermoplastic interlayer material such as polyvinyl butyral or silicone resin. Specific embodiments of the basic panel may assume various shapes and the arrangement of the panel components may vary depending upon particular design requirements. Additional components such as temperature control sensing devices may be incorporated into the basic panel structure.

The sheets of glass and/or rigid plastic used in the panel may be of the same or different sizes. The interlayers are usually relatively thick, varying from ⅛ inch to ½ inch in thickness, and the peripheral margins thereof may be cut flush with the edges of adjacent rigid sheets or may extend beyond the edges of some of the rigid sheets. Where an interlayer has extended portions, these portions may include one or more reinforcing frames or inserts of aluminum, stainless steel, or other suitable material bonded within the interlayer in a plane substantially parallel to that of the viewing surfaces of the panel and extending inwardly beyond the edges of the glass. The interlayer extension and reinforcing frame serve to provide a somewhat resilient means to securely mount the panel to the aircraft body. The reinforcing frame or insert imparts increased shear resistance to the extended portion of the interlayer in a normal installation.

Several problems have arisen with existing aircraft panel glazings during service including separation of the plies, particularly at the edges of the glazing, and cold chipping. Thus, the coefficient of thermal expansion of the polyvinyl butyral plastic is approximately six times that of glass in the normal temperature range in which aircraft is used. When the laminate is exposed to extremely low temperatures, the difference in thermal expansion of the glass and plastic frequently causes delamination or chipping of the glass at the bonded surfaces. Delamination occurs upon failure of the glass to plastic adhesive bond and cold chipping occurs as a result of the glass to plastic bond being stronger than the cohesive bond between adjacent portions of a glass surface. Generally, cold chipping and/or delamination originates along the edge of the interior surface of the glass sheets where it is theorized that the stress concentration is greatest. This stress concentration and subsequent delamination and/or cold chipping is even more pronounced along the edge of a larger glass sheet when the glass sheets are of unequal area. In actual aircraft applications, the stress concentration is intensified due to the pressure differential imposed upon the mounting at high altitude flying.

Previous attempts to reduce the tendency for delamination and cold chipping with subsequent moisture ingress and bus bar failure have been rewarded with a moderate degree of success. One method previously employed involves the addition of an adhesive, e.g. Thiokol, having low temperature elasticity to the interior marginal surface areas of the glass plies adjacent to the interlayer. Another method is to insert a parting material in the interlayer at varying depths from the inboard surfaces of the glass plies. Such parting materials may comprise cellophane and/or pressure sensitive Mylar and Teflon tapes.

It has now been discovered that by providing a layer of polyisobutylene resin between the plastic interlayer and the glass sheet at the marginal portions of the glazing unit and in the area of the bus bar or electrode on the glass the possibility of electrode failure, delamination, and cold chipping in such units can be greatly minimized if not entirely eliminated. In other words, it has been found that this specific material may be employed as an improved chip retarder, parting medium and sealant for aircraft glazings.

It is accordingly an object of this invention to provide an improved laminated electrically conducting aircraft glazing.

More particularly, it is an object of the invention to eliminate electrode failure in an electrically heated aircraft glazing even under the most extreme temperature conditions.

Other objects and advantages of the invention will become more apparent during the course of the following description when taken in connection with the accompanying drawings.

In the drawings, wherein like numerals are employed to designate like parts through the same:

Briefly stated, the improved electrically heated laminated glazing in accordance with the invention includes at least two sheets of glass and an interposed plastic interlayer bonded to the sheets, and in which the plastic interlayer and one of the glass sheets extends beyond an edge of the other of the sheets, a bus bar along the margin of an inwardly disposed surface of one of the sheets, a transparent electrically conducting film also on said surface and in contact with the bus bar, a first layer of polyisobutylene resin covering the area of the bus bar between said glass surface and the plastic interlayer, and a second layer of polyisobutylene resin disposed over the extended portion of said one glass sheet between the glass and the plastic interlayer.

Figure 1:
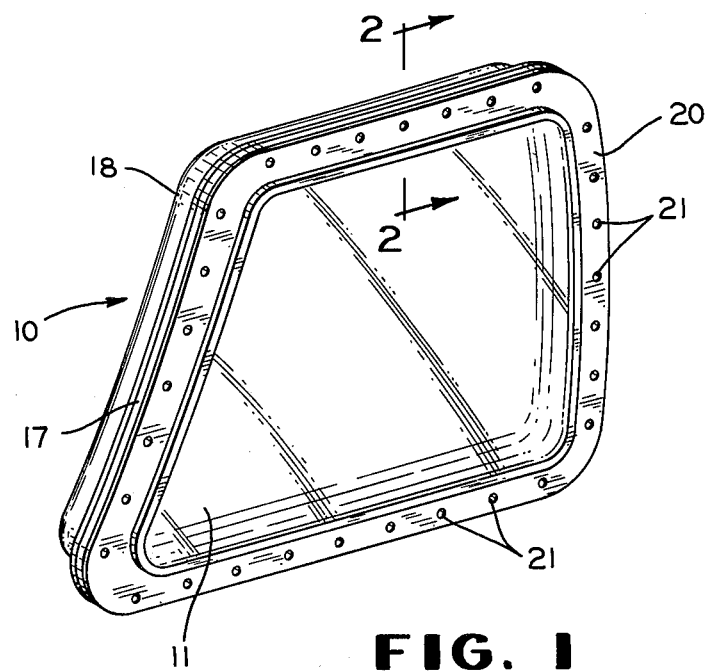
FIG. 1 is a plan view of a laminated electrically conducting aircraft glazing embodying the present invention.
Figure 2:
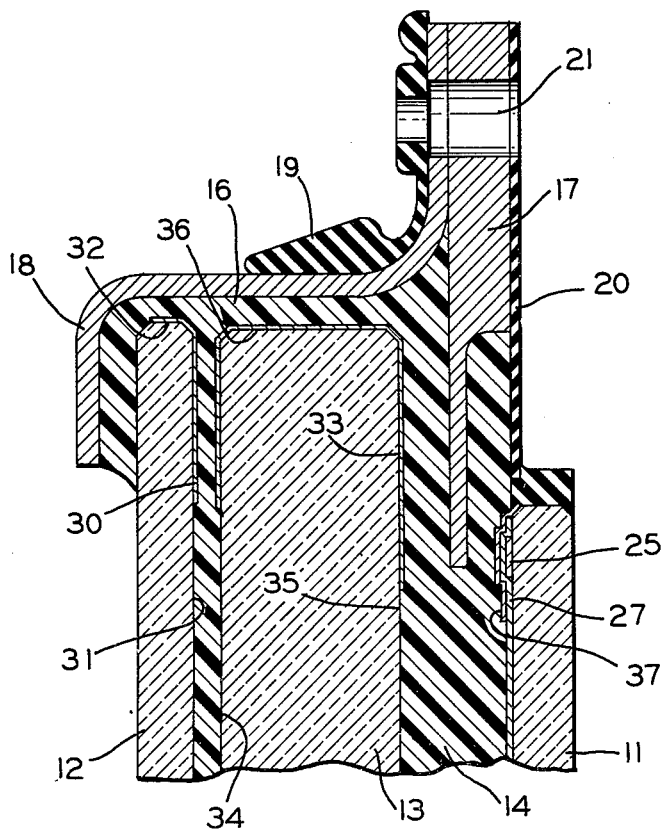
FIG. 2 is a sectional view taken substantially on the line 2—2 of FIG. 1.
Figure 3:
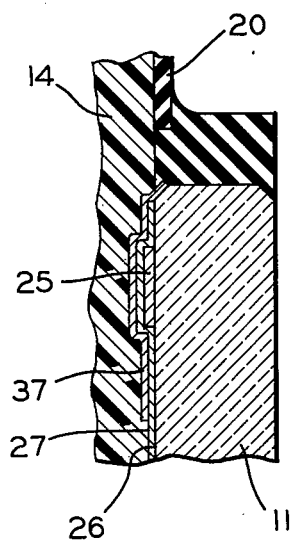
FIG. 3 is an enlarged fragmentary sectional view of the heating circuit of the aircraft glazing.

Referring now more particularly to the drawings, there is illustrated in FIG. 1 a window panel 10 constructed in accordance with the invention and including an outboard sheet of glass 11, an inboard glass sheet 12 and a thicker intermediate glass sheet 13. These sheets, one or more of which may be tempered or semitempered if desired, are bonded together by plastic interlayers 14 and 15 preferably composed of a transparent thermoplastic material such as polyvinyl butyral and laminated to the glass sheets under heat and pressure. In this respect, the interlayers themselves may be comprised of a laminated structure of thin sheets of thermoplastic material assembled together to the composite thickness required.

It should be noted that in the fabrication and manufacture of electrically conducting laminated aircraft panels, glass is most frequently used to form the rigid, transparent sheets or plies thereof. However, for many applications, polyester resins, acrylic resins, polycarbonate resins and other like materials may be advantageously employed in forming rigid, transparent sheet material for use in the structure of laminated panels. Thus, for the purpose of the present invention, when references are hereinafter made to glass sheets or plies used in the glazing structure, it is intended that the expression should also include rigid, transparent resinous sheet materials.

The surface areas of the glass sheets 12 and 13 are greater than that of the sheet 11 so that the marginal portions of the former extend beyond that of the outboard sheet 11. The interlayers 14 and 15 extend outwardly of the rigid transparent plies, as indicated at 16, with a metal reinforcing member 17 being embedded in the interlayer 14. This structure, together with a retaining bracket 18, a gasket 19, and a pre-cured resin facing sheet 20 provide a mounting or attaching frame. In this connection, bores are provided in the gasket, retaining bracket, reinforcing member and face sheet and these bores are aligned to form openings 21 to receive suitable fastening members (not shown) for attachment to the aircraft.

In order to render the panel or glazing unit 10 electrically conducting, the sheet 11, prior to laminating, is provided with suitable bus bars 25 along two opposite marginal portions of the inwardly disposed surface 26 of the sheet and with an electrically conducting transparent film 27 on the same surface. The composition of such bus bars and films, as well as methods of applying same, are of course well documented in the art and will not be detailed herein. Suffice to say that silver frits are commonly employed as bus bars and tin oxide, formed by spraying the glass surface with stannic tetrachloride, used as the transparent film material.

Now in accordance with the present invention, thin layers, e.g. tapes or strips, of a particular material are provided between the electrode area, and selected glass areas, and the contiguous plastic interlayer surfaces prior to laminating the glass and plastic layers together into a unitary structure. Thus, prior to lamination of the glass sheets 11, 12 and 13, a thin layer of polyisobutylene resin 30 is inserted as illustrated between the inwardly disposed surface 31 of the inboard sheet 12, and continuing over the edge 32, and the interlayer 15 and extended portion 16 thereof. A layer 33 of polyisobutylene resin is also provided along the marginal portions of the surfaces 34 and 35 of the sheet 13 and the edge 36 thereof. Both the layers 30 and 33 terminate outwardly of the desired viewing area of the glazing.

A third layer 37 of polyisobutylene resin is applied along the marginal area of the inboard surface of the outboard glass sheet 11 so as to adequately cover the bus bar 24 and to overlap inwardly a sufficient distance to insure that the entire width of the bus bar is thoroughly separated from the interlayer 14.

The polyisobutylene polymer used in accordance with the invention should comprise between 65 percent and 80 percent by weight of polyisobutylene with the remainder consisting essentially of carbon black. The resin should have a viscosity average molecular weight (Stoudinger) of between 8,500 and 12,000. One specific material which has been found satisfactory is available from the Tremco Company, Cleveland, Ohio, under the designation JS-780. This resin has a polyisobutylene content of between 71 percent and 76 percent (by weight) having a viscosity average molecular weight of 8,700 to 11,700 and a carbon black content of between 24 percent and 29 percent. The material is completely saturated, has a 100 percent Solids (non-volatile) and a consistency of 55 to 65 ASTM D-5. This material is available in ribbon or tape form which enables ease of incorporation into the panel structure. Thicknesses of the resin tape in the area of approximately 1/16 inch are preferred.

While the adhesion of the above-described polyisobutylene polymers to glass is normally excellent, primer coatings may be used and applied to the glass sheets prior to application of the resin tape thereto and subsequent lamination. Two such primers which have been found satisfactory are 3 percent by weight solutions of either isopropyl titanate or 2-ethylhexyl titanate in isopropanol.

Laminated glass panels produced in accordance with the invention and employing the type materials and construction illustrated herein were subjected to a number of tests conventional in the aircraft industry. The panels showed no evidence of deterioration after a series of test cycles including exposures to temperatures of −65° F. (12 hours) and +160° F. at 100 percent relative humidity (4 weeks), U.V. exposure (1000 hours) and water immersion and power applications (420 volts to heat).

It is to be understood that the forms of the invention herewith shown and described are to be taken as illustrative embodiments only of the same, and that various changes in the shape, size, composition and arrangement of parts, as well as various procedural changes may be restored to without departing from the spirit of the invention or the scope of the appended claims.

I claim:

1. In an electrically conducting laminated glazing unit including at least two sheets of glass and an interposed plastic interlayer bonded to said sheets and in which said plastic interlayer and one of said glass sheets extends beyond an edge of the other of the sheets, a bus bar along the margin of an inwardly disposed surface of one of said sheets, a transparent electrically conducting film also on said surface and in contact with said bus bar, a first layer of polyisobutylene resin covering the area of the bus bar between said glass surface and the plastic interlayer, and a second layer of polysiobutylene resin disposed over the extended portion of said one glass sheet between the glass and the plastic interlayers, said resin layers comprising between 65 percent and 80 percent by weight of polyisobutylene with the remainder consisting essentially of carbon black and having a viscosity average molecular weight of between 8500 and 12000.

2. An electrically conducting laminated glazing unit comprising at least two glass panels, one of said panels having a greater surface area than the other of said panels, an interlayer of non-brittle thermoplastic material interposed between the glass panels and integrally bonded thereto to produce a unitary structure, said thermoplastic material extending outwardly beyond each of said glass panels and having a thickened portion substantially enclosing the edges of the glass panels, bus bars along opposite margins of the surface of the second mentioned or smaller panel facing the thermoplastic material, a transparent coating of electrically conducting material also on said surface and in contact with said bus bars, a layer of polyisobutylene resin covering each of the bus bars and margins of the said smaller panel and extending over onto the adjoining edges thereof, and an additional layer of polyisobutylene resin covering the margins of the first mentioned glass panel and extending over onto the adjoining edges thereof, with the last mentioned polyisobutylene layer covering all of the marginal area of the first mentioned panel extending beyond the periphery of the smaller panel, said resin layers comprising between 65 percent and 80 percent by weight of polyisobutylene with the remainder consisting essentially of carbon black and having a viscosity average molecular weight of between 8500 and 12000.

3. A laminated aircraft glazing unit including at least one sheet of glass and a layer of non-brittle thermoplastic material integrally bonded thereto over a surface of the sheet and extending outwardly beyond the glass sheet, a thickened portion on the extended part of said thermoplastic layer integrally bonded to an edge of said glass sheet, a strip of polyisobutylene resin tape between the glass sheet and the thermoplastic layer along a margin of said glass sheet adjacent said edge, and a second strip of polyisobutylene resin tape between said edge of the glass sheet and the thickened portion of the extended thermoplastic layer, said resin tapes comprising between 65 percent and 80 percent by weight of polyisobutylene with the remainder consisting essentially of carbon black and having a viscosity average molecular weight of between 8500 and 12000.

* * * * *

UNITED STATES PATENT AND TRADEMARK OFFICE
CERTIFICATE OF CORRECTION

PATENT NO. : 4,284,677
DATED : August 18, 1981
INVENTOR(S) : Siegfried H. Herliczek It is certified that error appears in the above–identified patent and that said Letters Patent are hereby corrected as shown below:

Col. 3, line 56, "24" should be --25--
Col. 4, line 48, "interlayers" should be --interlayer--

Signed and Sealed this

Twenty-fourth Day of November 1981

[SEAL]

*Attest:*

*Attesting Officer*

GERALD J. MOSSINGHOFF
*Commissioner of Patents and Trademarks*